United States Patent [19]

Anderson

[11] Patent Number: 4,892,016
[45] Date of Patent: Jan. 9, 1990

[54] ADJUSTABLE SOCKET

[75] Inventor: J. E. C. Anderson, Moreland Hills, Ohio

[73] Assignee: Milbar Corporation, Chagrin Falls, Ohio

[21] Appl. No.: 344,549

[22] Filed: Apr. 20, 1989

Related U.S. Application Data

[63] Continuation of Ser. No. 162,980, Mar. 2, 1988, abandoned.

[51] Int. Cl.⁴ ............................................. B25B 13/18
[52] U.S. Cl. ......................................... 81/128; 279/64
[58] Field of Search ................... 81/128; 279/49, 56, 279/64

[56] References Cited

U.S. PATENT DOCUMENTS

| | | |
|---|---|---|
| 171,383 | 12/1875 | Hoppe . |
| 810,288 | 1/1906 | Le May . |
| 876,244 | 1/1908 | Shigon . |
| 885,926 | 4/1908 | Horst . |
| 1,288,154 | 12/1918 | Palmgren . |
| 1,470,197 | 10/1923 | Ryther . |
| 1,498,040 | 6/1924 | Johnson . |
| 1,554,963 | 9/1925 | Fisher . |
| 1,758,261 | 5/1930 | Leland ........................ 279/56 X |
| 2,086,587 | 7/1937 | Thompson . |
| 2,468,465 | 4/1949 | Sawyer . |
| 2,500,491 | 3/1950 | Hampton . |
| 2,580,247 | 12/1951 | Secondi et al. . |
| 2,582,444 | 1/1952 | Lucht . |
| 2,669,896 | 2/1954 | Clough . |
| 2,670,215 | 2/1954 | Fishwick . |
| 2,694,329 | 11/1954 | Thompson et al. . |
| 2,701,489 | 2/1955 | Osborn . |
| 2,850,931 | 9/1958 | Conway . |
| 2,884,826 | 5/1959 | Bruhn . |
| 2,931,660 | 4/1960 | Barwinkel . |
| 3,102,732 | 9/1963 | Livermont . |
| 3,339,439 | 9/1967 | Van Dalen et al. . |
| 3,724,299 | 4/1973 | Nelson . |
| 3,795,406 | 3/1974 | Rohm . |
| 4,213,355 | 7/1980 | Colvin . |
| 4,366,732 | 1/1983 | Schliep ........................ 81/128 |
| 4,366,733 | 1/1983 | Colvin . |
| 4,378,714 | 4/1983 | Colvin . |
| 4,500,226 | 2/1985 | Romand-Monnier . |
| 4,582,444 | 4/1986 | Miskinis . |
| 4,608,887 | 9/1986 | Colvin ........................ 81/128 |
| 4,663,999 | 5/1987 | Colvin . |

FOREIGN PATENT DOCUMENTS

| | | |
|---|---|---|
| 930657 | 7/1946 | France ........................ 81/128 |
| 50357 | 9/1918 | Sweden . |
| 619826 | 3/1949 | United Kingdom . |

Primary Examiner—James G. Smith
Attorney, Agent, or Firm—Watts, Hoffmann, Fisher & Heinke Co.

[57] ABSTRACT

An adjustable socket having a driver rotatably drivable about a central axis, wherein the driver includes inclined slideways extending with both radial and axial components with respect to the central axis. Jaws are supported within corresponding slideways of the driver for movement with respect to the central axis. The jaws each include an internal driver aperture having an axis transverse to the central axis. An adjuster provided with the socket includes a jaw operating member, jaw clips and a connection that secures the jaws, jaw operating member and jaw clips, to maintain the socket in the assembled condition and to limit inward movement of the jaws. The jaw operating member includes an annular flange projecting outwardly in a radial direction with respect to the central axis to axially locate the jaw clips. Mating helical surfaces support the adjuster on the driver for axial adjusting rotation to move the jaws axially and concomitantly inwardly and outwardly in the slideways for size adjustment of the jaws between open and closed positions.

11 Claims, 2 Drawing Sheets

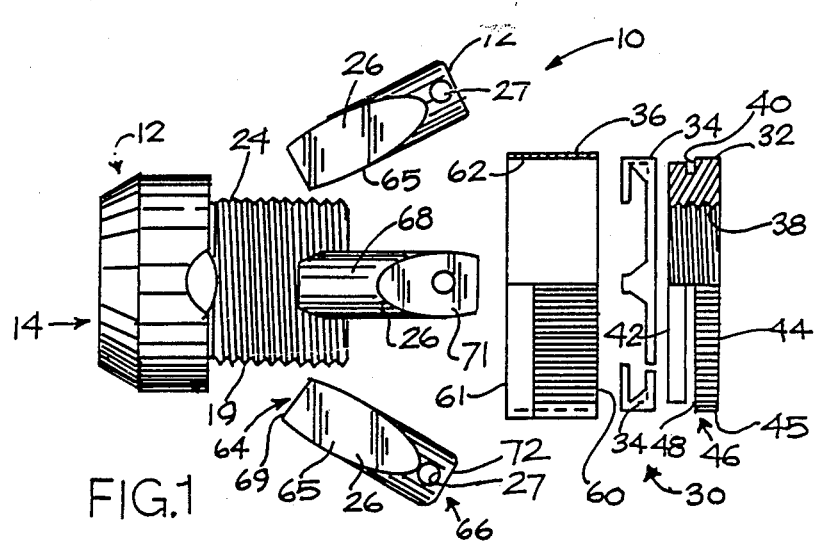
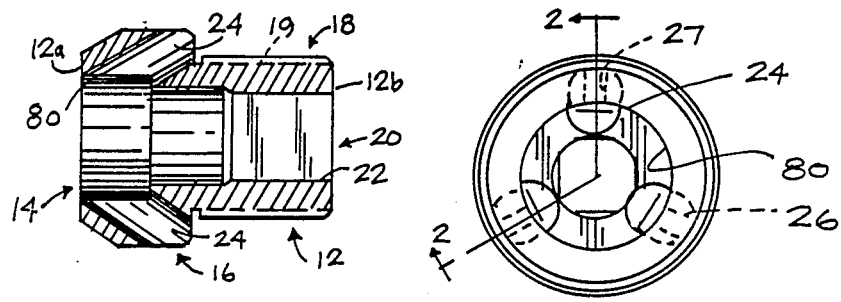
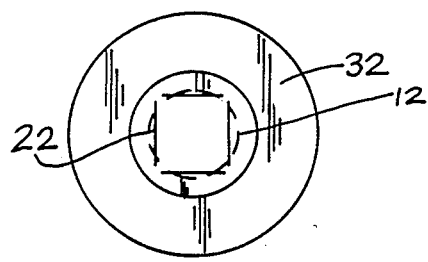
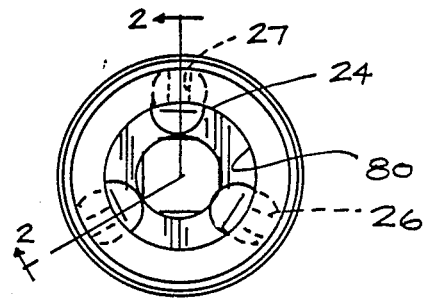
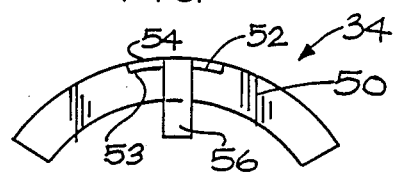
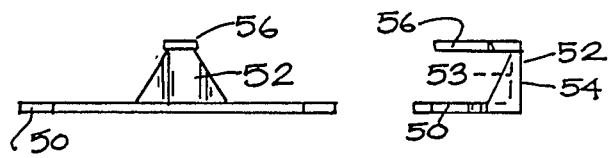
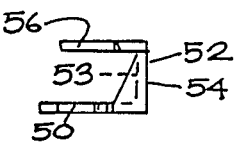

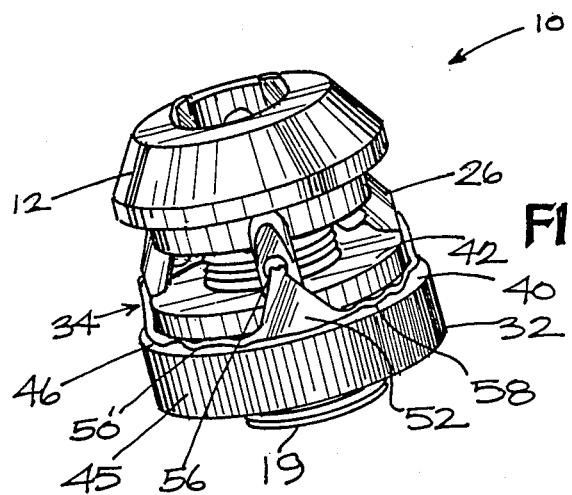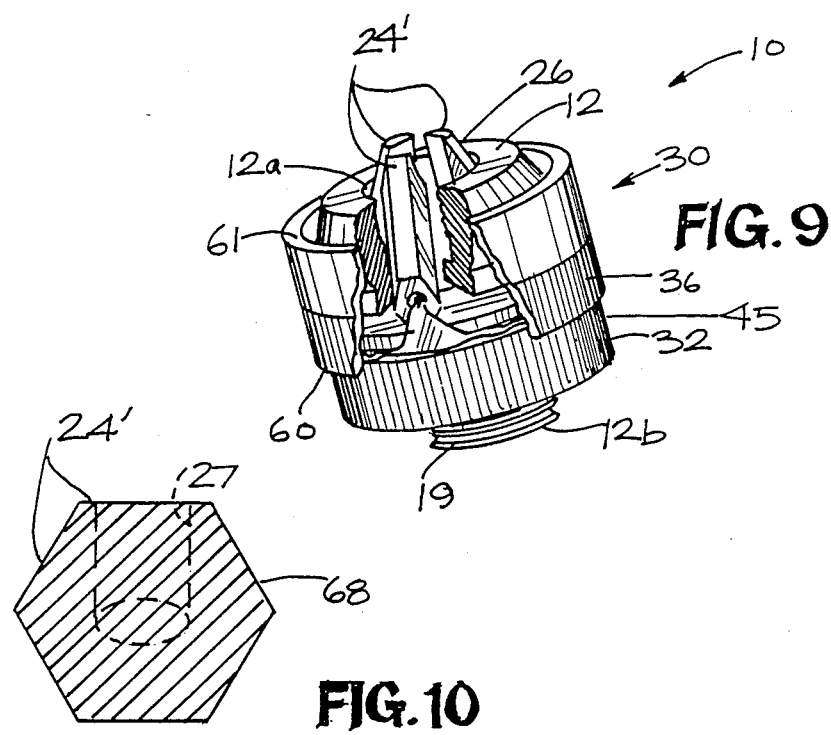

ADJUSTABLE SOCKET

This is a continuation of co-pending application Ser. No. 07/162,980 filed on 3/2/88 now abandoned.

TECHNICAL FIELD

This invention relates to an adjustable socket for driving threaded bolts and nuts of a range of sizes.

BACKGROUND ART

Adjustable sockets of the type driven by a ratchet or unitary wrench having a bent end that is received within a wrench opening are known in the prior art and may be used to replace more conventional socket sets which include a number of differently sized sockets for driving bolts and nuts of different sizes. Adjustable sockets are also disclosed in the prior art which are usable with straight wrenches having a handle end like a screwdriver or slidable wrench handle of the type normally used on hand taps.

Adjustable sockets generally include a set of jaws that are readily movable to receive and drive nuts and bolts of a range of sizes. Because the jaws can be adjusted to any position within the socket's adjustment range, it is possible to accommodate both English and Metric size nuts and bolts when the socket is appropriately adjusted. Thus, a mechanic can work on any particular job with a single adjustable socket without having to frequently remove one socket from the wrench and replace it with another socket. The use of a single adjustable socket also eliminates time consuming searches for sockets of a particular size, as well as the need for both English and Metric conventional socket sets.

While a variety of different adjustable sockets are known in the prior art, previous designs have had various disadvantages. Such disadvantages include sockets which have been difficult to manufacture, some which were not adaptable to a three-jaw construction and many which had particularly complex designs.

U.S. Pat. Nos. 4,213,355, 4,366,733 and 4,378,714 to Colvin, for example, disclose adjustable sockets wherein the jaws are mounted in driver slideways for inward adjusting movement against a spring bias and for outward adjusting movement under the impetus of the spring bias. This adjusting movement is provided by rotation of an adjuster having a helical locking surface that engages a helical locking surface on the driver to move a sleeve that has camming surfaces engaged with camming surfaces of the jaws. While this type of adjusting socket has achieved significant commercial success, the inward and outward adjusting movement involves spring bias making the socket complex in design and manufacture.

U.S. Pat. No. 4,608,887 to Colvin and U.S. patent application Ser. No. 07/092,437 to Cox et al. also disclose adjustable sockets which have received significant commercial acceptance. These sockets also each include jaws mounted in driver slideways. In each case adjusting movement of the jaws is provided by rotation of an adjuster having a jaw operating member with a radially extending annular flange which engages a radial slot in each jaw. The jaw operating members each engage a rotatable adjusting member having helical threads that engage helical threads on the driver to move the jaws upon rotation of the adjuster. One disadvantage of these designs, however, has been the problem of maintaining the jaws positioned within the slideways during opening and closing movement, as well as the disadvantage of being difficult to efficiently assemble.

DISCLOSURE OF THE INVENTION

The present invention provides an improved adjustable socket which is simple in construction and easily and efficiently assembled. The improved socket provides smooth adjustment capability of three jaws without involving any spring bias. The construction of the present invention is also economical to manufacture and effective in its operation. The compactly configured features of the socket make it additionally practical in its use.

As shown in a preferred embodiment, the tool includes a driver. When the tool is in use the driver is rotatively driven about a central axis. The driver has a plurality of inclined slideways extending with both radial and axial components with respect to the central axis. A plurality of jaws, preferably three in number so as to be usable with conventional, hexagonal nuts and bolts, are respectively supported within the slideways of the driver for inward and outward movement along with concomitant axial movement with respect to the central axis. The jaws and corresponding slideways may be either round or hexagonal in cross sectional configuration.

Each jaw includes a driver aperture that extends through the jaw along an axis transverse to the central axis. A socket adjuster is provided that includes support and interconnection members for the jaws. Another portion of the adjuster is threadedly engaged with the driver for rotative adjustments to move the jaws axially and concomitantly inwardly and outwardly for size adjustment.

The construction and operation of the driver, jaws and adjuster permit opening and closing movement of the socket jaws without involving any spring bias and additionally permit economical manufacture of the socket components and efficient assembly thereof, while still providing an extended lifetime of effective use.

In the preferred construction of the adjustable socket, the adjuster includes a jaw operating member, a plurality of jaw clips and a cylindrical sleeve that secures the jaws, jaw operating member and jaw clips in the assembled position and limits outward movement of the jaws to the open position.

The jaw operating member includes an outwardly projecting annular flange which supports the jaws during operation of the socket. A shoulder spaced from the annular flange in an axial direction away from the jaws supports the jaw clips on the operating member. The annular flange and shoulder thus form spaced extremities of an annular groove in which the jaw clips are captively engaged.

These and other features and advantages of the invention will be better understood from the following description of the invention shown in the accompanying drawings.

BRIEF DESCRIPTION OF THE DRAWINGS

FIG. 1 is an exploded view of an adjustable socket made in accordance with the present invention;

FIG. 2 is a cross-sectional view of the driver of the adjustable socket of the present invention as seen from the two planes indicated by the lines 2—2 of FIG. 3;

FIG. 3 is work engaging end view of the adjustable socket of the present invention in an assembled condition;

FIG. 4 is a driver engagement end view of the adjustable socket of the present invention in an assembled condition;

FIG. 5 is a top view of a jaw clip of the adjustable socket of the present invention;

FIGS. 6 and 7 are front end and elevational views of the jaw clip of FIG. 5 made in accordance with the present invention;

FIG. 8 is a perspective view of the adjustable socket of the present invention with the cylindrical sleeve removed and the jaws in an open position;

FIG. 9 is perspective of the adjustable socket with the cylindrical sleeve in position and the jaws in a closed position; and FIG. 10 is a cross sectional view of a hexagonal jaw.

BEST MODE FOR CARRYING OUT THE INVENTION

An exploded view of the preferred embodiment of an adjustable socket of the present invention is illustrated in FIG. 1 of the drawings. The adjustable socket 10 provides rotational driving of conventional nuts or bolts having hexagonal heads. The socket includes, a driver 12 in which three jaw slideways 24 are formed. Three jaws 26 are provided, each for positioning in a different one of the slideways.

As shown in FIG. 2, the driver 12 includes a work receiving end portion 14, an intermediate portion 16 and a drivable end portion 18. The driver has a through axial bore 20 extending from a work receiving end 12a to a drivable end 12b. The work receiving portion 14 includes the jaw slideways 24 which receive the movable jaws 26. The drivable or opposing end portion 18 includes wrench engaging walls 22 defining a drivable end portion of the bore 20. The driver is rotatably drivable about an axis by a wrench engaging the wrench engaging walls.

Each of the jaw slideways 24 is oriented about a jaw operating axis and each jaw axis has both radial and axial components with respect to the central axis. The jaw operating axes extend to intersect the central bore axis at a common point spaced from the work receiving end 12a of the driver.

Each of the jaws 26 is associated with and movable within a complemental one of the slideways 24. The jaws comprise elongate members each including an internal jaw aperture 27 having an axis an extension of which perpendicularly intersects the central bore axis. The jaws are of a rounded cross-sectional configuration as shown in FIG. 1, or alternatively, a hexagonal configuration as shown at 24, in FIGS. 9 and 10. The cross-sectional configuration of the jaws and cross-sectional configuration of the associated slideways are complementary for receiving and cooperating with the jaws to provide inward and outward jaw movement along the jaw operating axes. Use of the complementary hexagonal configuration of the jaws and slideways limits torquing movement of the jaws about the slideway axes during operation of the socket.

The driver preferably includes three slideways and three associated jaws to provide gripping of alternate surfaces of a conventional hexagonal nut or bolt. Other numbers of jaw and slideway combinations are possible depending on the type of device to be gripped and driven.

An adjuster 30 is movably connected along the drivable portion 18 and includes a jaw operating member 32, jaw clips 34 for engagement with the jaws and a cylindrical sleeve 36.

Mating helical surfaces preferably embodied by threads 19 on the driver 12 and threads 38 on the jaw operating member 32 support the adjuster 30 on the driver for adjusting rotation along the central bore axis.

As illustrated in FIG. 1, the threaded bore of the jaw operating member is aligned along the central or bore axis of the driver. An internal annular shoulder 40 is provided. The shoulder is positioned on the operating member intermediate a jaw support end 42 and an opposing outer end 44. A groove 46 is formed adjacent the shoulder 40 and spaced from the jaw support end 42. The diameter of the jaw support end 42 is dimensioned so that the jaw support end is positioned within the cylindrical sleeve when the adjuster is assembled. The diameter of a serrated portion 45 adjacent the outer end 44 is larger than the diameter of the jaw support end 42. The diameter of the serrated portion 45 is slightly greater than the inside diameter of the cylindrical sleeve 36 such that when the adjuster 30 is assembled, the sleeve 36 pressed over a part of the serrated portion 45 to provide an interference fit which maintains the adjuster in an assembled condition.

As shown in FIGS. 5–7, the jaw clips 34 are of an arcuate configuration and include a frame or base portion 50 and a neck portion 52 extending transversely from the frame 50 and having inner and outer abutment surfaces 53, 54. Each clip has a tongue portion 56 which extends transversely from the neck portion 52. Each tongue portion 56 projects into and is adapted for engagement with walls of the aperture 27 of an associated jaw 26.

As shown in the embodiment of FIG. 8, each arcuate frame portion 50 is supported adjacent the internal annular shoulder 40, with the neck portion extending in a direction parallel with the central axis for a distance beyond the jaw support end 42. The frame portion 50 is positioned within the groove 46 such that the inner abutment surface 53 engages the jaw operator adjacent the jaw support end. The frame portion 50' of FIG. 8 is bent to provide opposed leg portions 58 such that the frame portion 50' is supported within the groove 46 with the legs 58 engaging both the shoulder portion 40 and an opposite engagement surface 48. The frames may be formed of sheet metal or cast.

The cylindrical sleeve 36 includes a first end 60 to overlie the serrated portion 45 and a second end 61 adjacent the driver. An inner engagement surface 62 is also provided to engage the outer abutment surface 54 of the jaw clip neck 52 when the sleeve is press fit over the serrated portion to interconnect the jaw operating member, jaw clips and jaws.

As illustrated, the work receiving portion 14 of the driver 12 includes an outer ring circumscribing the inclined jaw slideways 24. The outer ring includes circumferentially spaced slideway surfaces that define the extremities of the jaw slideways 24.

The jaws 26 and jaw slideways 24 are complementally contoured to include a cylindrical cross sectional configuration as shown in FIGS. 3 and 8, or a hexagonal cross-section as shown in FIGS. 9 and 10. The sloping orientation of the slideways guides the jaws concomitantly inwardly and outwardly for size adjustment. This adjustment capability allows the jaws to infinitely adjust over a range of sizes to rotatably torque and untorque different sized nuts and bolts falling within the range.

Each jaw 26 includes a workpiece end portion 64 and an inner support end portion 66. The workpiece end portion includes a flat nut or bolt head gripping surface 65 which faces inwardly toward the central axis. An outer jaw surface 68 defines the circumferential jaw shape with respect to the jaw operating axis. This outer surface 68 is the surface that is complemental with the walls of the slideways 24. At the outer tip of the jaws, the outer jaw surface is connected to the gripping surface 65 by an end surface 69.

The inner end portion of each jaw includes the driver aperture 27 that extends through the jaw along an axis perpendicular to the bore axis. The driver aperture enters the jaw through an outer aperture surface 71 which is substantially parallel to the gripping surface 65.

In the embodiment of FIGS. 1-8, orientation of the gripping surface is maintained by engagement of the jaw clip tongue portion 56 within the jaw aperture 27. In the embodiment of FIGS. 9 and 10, the orientation is additionally maintained by engagement of the hexagonal jaw with complemental hexagonal slideways.

The aperture surface 71 is connected to the jaw surface 68 by a jaw drive end surface 72. These drive end surfaces 72 engage the support end 42 of the jaw operating member 32 such that as the operating member is threaded onto the driver 12, the jaws are driven in a closing, workpiece gripping direction.

As illustrated in FIG. 2, the through bore 20 of the driver extends axially through the driver and has an enlarged portion 80 in the work receiving portion 14. That part of the through bore 20 defined by the wrench engaging walls 22 is a square end portion 82 which receives an associated wrench. The square end portion includes depressions (not illustrated) for receiving a detent of the associated wrench.

To assemble the socket, the components are positioned such that the driver and jaw operating member are threadedly engaged along their respective threads. The jaws are then slidably inserted into their associated slideways. The jaw clips are then engaged by inserting each jaw clip tongue 56 into the associated aperture 27, and seating the clip frame portion 50 in the groove 46, as shown in FIG. 8. The cylindrical sleeve 36 is then engaged over the serrated portion 45 into a press fit connection with the operating member 32 as in FIG. 9. If desired to strengthen the sleeve to operating member connection, a staking operation may be performed to provide a stake which engages the sleeve with the operating member. Once assembly is completed the socket appears as shown in FIG. 9.

Upon movement from the open position shown in FIG. 8 to the closed position shown in FIG. 9, rotation of the jaw operating member relative to the driver causes the support end surface 42 to drive the jaws 26 in a closing direction. Upon reverse rotation of the operating member coaction of the tongues 56 with the jaw apertures 27 causes the jaws to move from the closed position of FIG. 9 toward the open position of FIG. 8.

Engagement of the jaws with the inner abutment surfaces 53, and concommittant engagement of the outer abutment surface 54 with the sleeve inner engagement surface 62, limits the amount the jaws may be opened. Closing movement of the jaws is limited by engagement of the jaw operating member support end 42 with the driver 12.

While the best mode for carrying out the invention has been described in detail, it will be apparent that modifications and alternate embodiments can be made without departing from the spirit and scope of the invention set forth by the following claims.

I claim:
1. An adjustable socket comprising:
a driver rotatable a longitudinal axis, said driver having a plurality of inclined slideways extending with both radial and axial components with respect to the longitudinal axis;
a plurality of jaws respectively supported within the slideways of the driver for inward and outward movement along with concomitant axial movement with respect to the longitudinal axis;
each of said jaws having an internal driver aperture having an aperture axis transverse to said longitudinal axis;
an adjuster including a jaw operating member, a plurality of jaw clips and a connection that secures the jaws, jaw operating member and jaw clips to maintain the assembled condition of the socket and limit movement of the jaws;
said jaw operating member including a flange surface projecting outwardly with respect to the longitudinal axis, and groove structure spaced from said flange for supporting said jaw clips during operating engagement with walls of the driving apertures in each of said jaws;
mating helical surfaces supporting the adjuster on the driver for axial adjusting motion upon relative rotation that moves the jaws axially and concomitantly inwardly or outwardly along the slideways for size adjustment between open and closed positions;
said jaws each having a surface complemental to and in engagement with said flange surface during movement from said open to said closed positions and when the socket is in use; and,
each of said jaw clips being in engagement with a wall of said groove and an associated driving aperture wall when the socket is moved from its closed to its open position.

2. An adjustable socket comprising:
a driver that is rotatably drivable about a central axis;
said driver having a plurality of inclined slideways each having slideway surfaces with both radial and axial components with respect to the central axis;
a plurality of jaws each having a work engagement and a slideway engaging surface;
said jaws being respectively supported for slidable engagement of the slideway engaging and the slideway surfaces for inward and outward movement along with concomitant axial movement with respect to the central axis;
each jaw having an internal jaw aperture oriented about an axis transverse to said central axis;
an adjuster for adjustment of the jaws between positions and limiting inward movement of the jaws including a jaw operating member, a plurality of jaw clips and a sleeve member having an inner surface for engagement with said jaw clips;
said jaw clips each having a transversely extending tongue portion for engagement with walls of the internal jaw aperture, and the jaw operating member having clip engagement surface for engagement with the jaw clips; and mating helical surfaces for supporting the adjuster on the driver for axial adjusting rotation moving the jaws axially and concomitantly inwardly and outwardly along the slideway surfaces for size adjustment between open and closed positions.

3. The adjustable socket of claim 2 wherein said inclined slideways are each oriented about an associated jaw operating axes having both radial and axial components with respect to the central axis all of which operating axis extend to intersect the central axis at a common point;

said slideway surfaces of each slideway defining a polygon in a plane of cross section transverse to the jaw operating axis.

4. The adjustable socket of claim 3 wherein said jaws each have a polygonal cross sectional shape complemental to an associated slideway's polygonal surfaces.

5. An adjustable socket comprising:
   (a) a driver rotatably drivable about a central axis, said driver having a plurality about a central axis, said driver having a plurality of inclined slideways each of which has slideway surfaces extending with both radial and axial components with respect to the central axis;
   (b) a plurality of jaws respectively supported within the slideways for inward and outward movement along with concomitant axial movement with respect to the central axis; each jaw having a hexagonal cross sectional shape received by the respective complementary slideway and including slideway engaging surfaces slidably complementally supported by the slideway surfaces; each jaw also having an aperture that opens outwardly away from the central axis in a radial direction;
   (c) a jaw operating member including an annular flange that projects outwardly with respect to the central axis in a radial direction and supports said jaws during operation;
   (d) a plurality of jaw clips supported by said jaw operating member, each including a tongue portion that extends inwardly with respect to the central axis in a radial direction from a clip frame portion and is received within the jaw aperture to provide axial jaw movement which results in inward and outward jaw movement along the slideways;
   (e) a cylindrical sleeve securing the jaws, jaw clips and jaw operating member in assembled condition during operation; and
   (f) mating helical threads that support the jaw operating member on the driver for axial adjusting rotation that moves the jaws along the slideway surfaces for size adjustment between open and closed positions.

6. The adjustable socket of claim 5 wherein the clip frame portion of each of said jaw clips includes an arcuate base for supporting its clip on said jaw operating member intermediate said annular flange and a shoulder spaced from said flange in an axial direction, each clip also including a neck portion extending from its base in the direction of the central axis, and the tongue portion extending from the neck portion inwardly with respect to the central axis in a radial direction for engagement with walls defining said jaw aperture.

7. The adjustable socket of claim 6 wherein the neck portion of said clip frame includes an inner surface abutable with said annular flange and an outer surface abutable with said cylindrical sleeve.

8. An adjustable socket comprising:
   (a) an elongate tubular driver including workpiece receiving, intermediate and drivable portions and through bore extending from one end to the other along a bore axis;
   (b) the driver having wrench engaging walls defining the bore adjacent the one end and within the drivable portion;
   (c) the driver having a plurality of jaw receiving slideways formed in the workpiece receiving portion, each of the slideways having an axis disposed in an imaginary plane located by the axes of the slideway and the bore, each slideway axis being convergent toward the bore axis in a direction from one end toward the other;
   (d) a plurality of jaws each associated with and movably disposed in a different one of the slideways, and having an internal jaw aperture;
   (e) an adjuster movably connected to the intermediate portion in socket adjusting relationship and supporting each of the jaws for adjustably positioning the jaws in their associated slideways in response to adjuster axial movement;
   (f) said adjuster including a jaw operating member, another element and at least one jaw clip operatively connected with one of said jaw apertures and maintained in the connection by an interconnection formed once the socket is assembled and the member and said another element are secured together as a unitary adjuster;
   (g) each of said jaws being in positive engagement with the jaw operating member when the socket is in use; and,
   (h) the clip being in operative engagement with a wall of said one jaw aperture and a selected one of said another element and the operating member as the socket is adjusted in a jaw opening direction.

9. The socket of claim 8 wherein the jaws comprise elongate members having polygonal cross-sectional shapes received by respective slideways having complementary cross-sectional configurations limiting torquing movement of the jaws about the slideway axes during socket operation.

10. An adjustable socket comprising:
   (a) an elongate tubular driver including workpiece receiving, intermediate and driveable portions and a through bore extending from one end to the other along a bore axis;
   (b) the driver having wrench engaging walls defining the bore adjacent the one end and within the driveable portion;
   (c) the driver having a plurality of jaw receiving slideways formed in the workpiece receiving portion, each of the slideways having an axis disposed in an imaginary plane located by the axes of the slideway and the bore, each slideway axis being convergent toward the bore axis in a direction from one end toward the other;
   (d) a plurality of jaws each associated with and movably disposed in a different one of the slideways, and having an internal jaw aperture;
   (e) an adjuster movably connected to the intermediate portion in socket adjusting relationship and supporting each of the jaws for adjustably positioning the jaws in their associated slideways in response to adjuster axial movement;
   (f) said adjuster including a jaw operating member, another element and at least one jaw clip operatively connected with one of said jaw apertures and maintained in the connection by an interconnection formed once the socket is assembled and the member and said another element are secured together as a unitary adjuster;

(g) said jaws comprising elongate members having polygonal cross-sectional shapes received by respective slideways having complementary cross-sectional configurations limiting torquing movement of the jaws about the slideway axes during socket operation; and (h) said jaw operating member includes an internal portion, an adjusting portion, and a threaded bore extending through the member, an annular flange extending outwardly from a groove in the internal portion for supporting said jaws with the slideways and said groove supporting said jaw clips during adjustable positioning of the jaws in response to axial movement of the adjuster.

11. The socket of claim 10 wherein the adjuster includes an internal annular surface for driving engagement with the jaws during jaw closing movement.

* * * * *